United States Patent

Grundman

[15] 3,654,777
[45] Apr. 11, 1972

[54] TORQUE TRANSMITTING DEVICE
[72] Inventor: Roger V. Grundman, Roseville, Minn.
[73] Assignee: Minnesota Mining and Manufacturing Company, St. Paul, Minn.
[22] Filed: Nov. 25, 1970
[21] Appl. No.: 92,761

[52] U.S. Cl. .............................. 64/30, 74/214, 192/107 M
[51] Int. Cl. .............................................. F16d 7/02
[58] Field of Search ............... 64/30, 28 F; 74/214, 215; 192/107 M

[56] References Cited

UNITED STATES PATENTS 2,655,241  10/1953  Hultberg .............................. 64/30 R
3,434,577  3/1969   Mathison ............................. 192/107 M Primary Examiner—Edward G. Favors
Attorney—Kinney, Alexander, Sell, Steldt & Delahunt

[57] ABSTRACT

A torque transmitting device in which a plurality of fibers extend perpendicularly from one of a pair of normally opposed, generally parallel surfaces to engage circumferentially spaced protuberances defining the other surface. The torque transmitting surfaces are defined on a pair of relatively rotatable members and the extent of fiber engagement is adjustable to permit adjustment of the torque transmitted between the members by engagement of the fibers with the protuberances upon relative rotation of the members.

23 Claims, 7 Drawing Figures

INVENTOR.
ROGER V. GRUNDMAN
BY Kinney, Alexander
Sell, Steldt & DeLaHunt
ATTORNEYS INVENTOR.
ROGER V. GRUNDMAN
BY Kinney, Alexander,
Sell, Steldt & DeLaHunt
ATTORNEYS

TORQUE TRANSMITTING DEVICE

BACKGROUND OF THE INVENTION

The present invention relates to a torque transmitting device in which fibers extending perpendicularly from one member engage protuberances defining a torque transmitting surface of a second relatively rotatable member.

Torque transmitting devices have utilized both straight and special formed fibers. In the prior art, fibers extending from one torque transmitting member have generally engaged fibers of the same type extending from a second member as disclosed in U.S. Pat. No. 2,424,873; 2,941,410 and 3,143,895. Very little torque is transmitted between flexible fibers that extend perpendicularly from facing torque transmitting surfaces since the fibers tend to brush past one another rather than engaging. For this reason, U.S. Pat. No. 2,424,873 discloses the use of stiff fibers such as metal fibers; U.S. Pat. No. 2,941,410 discloses the use of straight fibers specially arranged on the torque transmitting surfaces; and U.S. Pat. No. 3,143,895 discloses the use of fibers specially formed for engagement. However, these have been disadvantageous in that the first leaves little flexibility of choice of fibers without sacrificing efficiency, the second requires special manufacturing equipment to arrange the fibers after they have been flocked normal to the torque transmitting surfaces, and the third requires special manufacturing equipment to form the fibers.

SUMMARY OF THE INVENTION

The present invention provides a torque transmitting device comprising a pair of relatively rotatable members having spaced, generally parallel torque transmitting surfaces. A plurality of short, elastic, normally straight fibers are secured to one of the surfaces and extend perpendicularly therefrom generally equal distances greater than the minimum spacing between the torque transmitting surfaces. A plurality of protuberances circumferentially spaced with respect to the axis of rotation of the members define the other of the torque transmitting surfaces. Upon relative rotation of the members the fibers engage the protuberances and transmit torque between the members through the resistance of the fibers to bending. The extent of fiber engagement is made adjustable and for each setting there is a corresponding limiting torque which may be transmitted between the members.

DESCRIPTION OF THE PREFERRED EMBODIMENTS

Figure 1:
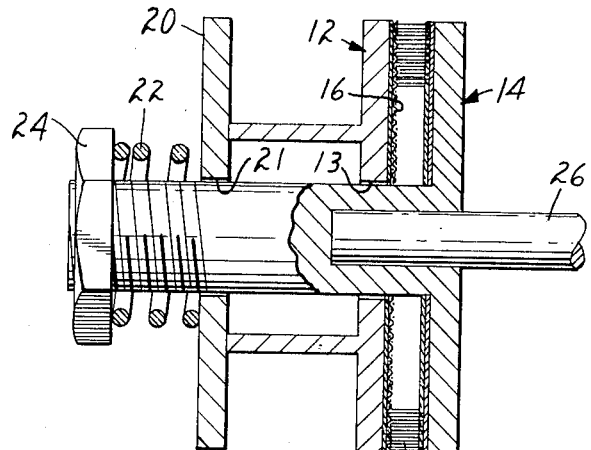
FIG. 1 is a side elevational view of one embodiment of a torque transmitting device constructed in accordance with the present invention and partially in section.
Figure 2:
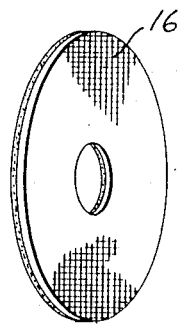
FIG. 2 and 3 are perspective views of parts of the device of FIG. 1.
Figure 3:
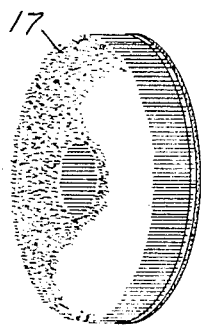
Figure 4:
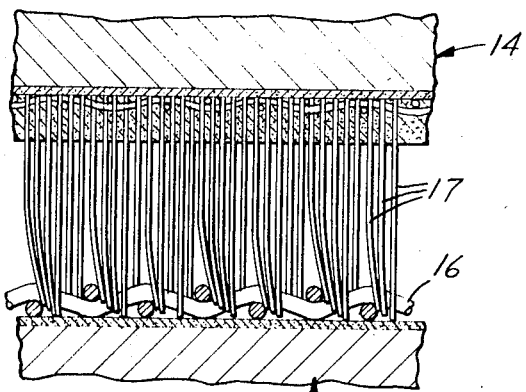
FIG. 4 is a cross section view of a portion of the device of FIG. 1.

Referring now to FIGS. 1–4 there is illustrated a first embodiment of a torque transmitting device, generally designated 10, constructed in accordance with the present invention and comprising a first torque transmitting member 12 and a second torque transmitting member 14 having spaced, parallel, opposed, facing generally planar torque transmitting surfaces.

The first torque transmitting member 12 has the shape of a circular disk, one face of which defines its torque transmitting surface, with a hollow cylinder extending coaxially from the opposite face of the disk. In the illustrated embodiment a generally uniform pattern of protuberances circumferentially spaced with respect to the axis of the first member 12 is defined by a regular woven screen 16, preferably of a 16 to 40 mesh, formed from metal filaments, preferably having a diameter of from 0.007 inch to 0.020 inch. In this embodiment the radial component of each filament of the screen 16 serves as a torque transmitting protuberance. The screen 16 is adhesively bonded to a solid disk which with the hollow cylindrical portion of the first member 12 may be molded from a thermoplastic material. However, the entire first torque transmitting member 12 may also be a single piece thermoplastic molding with the torque transmitting surface thereof embossed to define the circumferentially spaced protuberances as radial ribs, a mesh or other similar patterns.

The second torque transmitting member has the shape of a disk with a solid circular cylinder extending perpendicularly centrally from its torque transmitting surface. The first torque transmitting member is formed with a central circular aperture 13 and the cylindrical portion of the second torque transmitting member 14 is formed to extend coaxially therethrough and through an aperture 21 formed in a support wall 20. The free end of the cylindrical portion extending through the support wall 20 is threaded, a helical compression spring 22 is placed thereover and an adjusting nut 24 is turned onto the threaded portion to compress the spring 22.

A plurality of short, elastic, normally straight fibers 17 are secured to the torque transmitting surface of the second member 14 and extend perpendicularly therefrom. In the illustrated embodiment the fibers 17 are embedded in an adhesive set on a fabric base and the composite is adhesively bonded to a torque transmitting surface of the second member 14. This permits the fibers to be flocked and bonded onto the fabric base in a conventional manner. The fibers preferably have a length of from 0.080 inch to 0.250 inch and are 30 denier to 500 denier for nylon, polyester and like fibers or 0.001 inch to 0.010 inch in diameter for metal fibers. The fiber density is preferably from 200 to 14,000 fibers per square inch and the density is preferably inversely related to the fiber diameter chosen.

A drive or holding shaft 26 is secured coaxially with the second member 14 in a recess formed therein. This shaft 26 permits driving of the second member 14 or alternatively it permits the second member 14 to be held against rotation.

In use, the cylindrical portion of the first torque transmitting member 12 may define a pulley in a drive system around which a belt may extend to drive it. The shaft 26 secured to the second torque transmitting member 14 may be held stationary whereby the torque transmitting device 10 acts as a rotational brake. Driving of the first member 12 will cause it to rotate with respect to the second member 14 and the fibers 17 will be flexed into and out of the openings in the wire screen 16. Some of the rotational energy of the first member 12 will then be dissipated in flexing the fibers 17 due to the resistance of each fiber to bending under the force of a bending moment. Depending upon the bending strength of the fibers chosen there will be a limit on the amount of rotational energy which can be dissipated. The limiting torque that is transmitted by engagement of the fibers with the mesh is adjustable by turning the nut 24 to adjust the depth of penetration of the fibers 17 through the mesh 16. The flexure of the fibers during torque transmission provides a self-cleaning action to assure consistency of torque transmission and the provision of a high density of fibers assures that a generally constant number of fibers will at all times be in engagement thereby assuring a constant torque transmission.

With the first member 12 driven as described above, the shaft 26 may, alternatively, form a drive shaft to transmit torque to a secondary portion of the drive system. In this case with each setting of the adjustment nut 24 there will be an associated constant limiting torque transmission from the first member 12 to a second member 14 through the fibers 17.

Because the bending strength of the fibers 17 is a constant, the torque required to be applied to the first member 12 to start its rotation relative to the second member 14 is generally the same as that required to continue the relative rotation, it only being necessary to overcome the relatively small inertial energy of the parts to start the rotation. This is highly advantageous over those torque transmitting devices using sliding contact surfaces in which the coefficient of static friction is always greater than that of dynamic friction thereby requiring a much higher torque to initially cause relative rotation between the members.

Figure 5:
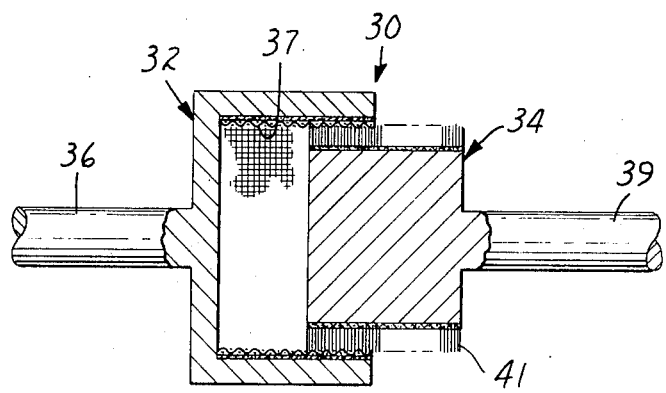
FIG. 5 is a side elevation view of a second embodiment of a torque transmitting device constructed in accordance with the present invention and partially in section.
Figures 6, 7:
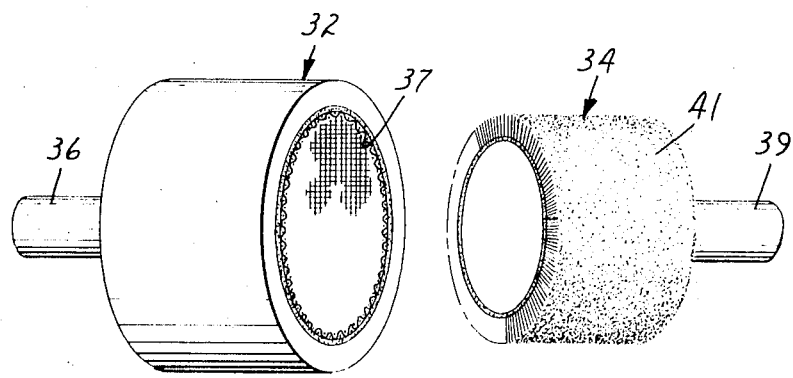
FIGS. 6 and 7 are perspective view of parts of the device of FIG. 5.

Referring now to FIGS. 5–7 there is illustrated a second embodiment of a torque transmitting device, generally designated 30, constructed in accordance with the present invention and comprising a first torque transmitting member 32 and a second torque transmitting member 34 having spaced, generally parallel, normally opposed torque transmitting surfaces.

The first torque transmitting member 32 has the shape of a hollow cylinder having one end closed and a drive or holding shaft 36 extending coaxially from the exterior surface of the closed end of the cylinder. As in the first embodiment, a generally uniform pattern of protuberances circumferentially spaced with respect to the axis of the first member 32 is defined by a regular woven screen 37, preferably like that described with reference to the first embodiment. The screen 37 is secured to the curved inner surface of the cylindrical portion of the first member 32 with the torque transmitting filaments thereof parallel to the axis of the cylindrical portion to define the torque transmitting surface of the first member.

The second torque transmitting member 34 is supported coaxially with the first member 32 and it has the shape of a solid cylinder with a drive or holding shaft 39 extending coaxially from one end of the cylindrical portion. The solid cylindrical portion of the second member 34 has a diameter less than the internal diameter of the torque transmitting surface of the first member 32. A plurality of fibers 41 like those described with reference to the first embodiment are secured to the curved torque transmitting surface of the cylindrical portion of the second member 34 preferably in a manner as described with reference to the first embodiment. The fibers 41 extend perpendicularly from the torque transmitting surface of the second member 34 generally equal distances.

The first and second torque transmitting members 32 and 34 are supported with their torque transmitting surfaces normally directly opposed. Through support of their drive or holding shafts 36 and 39, the first and second members 32 and 34 are supported for relative rotation to transmit torque between the members and for relative axial movement to permit a relative offsetting of the torque transmitting surfaces as illustrated in FIG. 5 and thereby to adjust the extent of the engagement of the fibers 41 with the screen 37 and the limiting torque that can be transmitted between the members.

In use, as with the first embodiment, the drive or holding shafts 36 and 39 of the torque transmitting members 32 and 34 may be elements in a drive system. With one of the shafts 36 or 39 held stationary and the other shaft driven, the device serves as a constant limiting torque rotational brake in the same manner as described with reference to the first embodiment. With both shafts 36 and 39 rotatable, the device serves as a constant limiting torque transmitting device also as described with reference to the first embodiment. In either arrangement the constant limiting torque may be adjusted by relative axial movement of the members to cause offsetting of the torque transmitting surfaces, the greatest limiting torque for a specific device being attained when the torque transmitting surfaces are directly opposed.

Having described the present invention with reference to two preferred embodiments it is to be understood that minor modifications may be affected without departing from the spirit or scope of the present invention.

I claim:

1. A torque transmitting device comprising:
   a pair of coaxially supported members having spaced, generally parallel, normally opposed torque transmitting surfaces, at least one of said members being supported for rotation about the common axis,
   a plurality of short, elastic, normally straight fibers secured to one of said torque transmitting surfaces and extending generally perpendicularly therefrom generally equal distances greater than the minimum spacing between said torque transmitting surfaces, and
   a plurality of protuberances circumferentially spaced with respect to said common axis of said members to define the other of said torque transmitting surfaces,
   whereby upon relative rotation of said members said fibers engage said protuberances to transmit torque between said members through the resistance of said fibers to bending.

2. A torque transmitting device as recited in claim 1 including means for adjusting the extent of engagement of said fibers with said protuberances to permit adjustment of the torque that may be transmitted between said members.

3. A torque transmitting device as recited in claim 1 wherein said protuberances define a generally uniform pattern torque transmitting surface.

4. A torque transmitting device as recited in claim 3 wherein said protuberances are defined by a regular woven mesh secured to a generally solid support surface.

5. A torque transmitting device as recited in claim 4 including means for adjusting the extent of engagement of said fibers with said protuberances to permit adjustment of the torque that may be transmitted between said members.

6. A torque transmitting device as recited in claim 1 wherein said other member is supported against rotation to form a constant limiting torque rotational brake.

7. A torque transmitting device as recited in claim 1 wherein said other member is independently supported for rotation about said common axis to form a constant limiting torque slip clutch.

8. A torque transmitting device comprising:
   a pair of members having spaced, generally parallel, facing torque transmitting surfaces, at least one of said members being supported for rotation about an axis generally perpendicular to said torque transmitting surfaces,
   a plurality of short, elastic, normally straight fibers secured to one of said torque transmitting surfaces and extending perpendicularly therefrom generally equal distances greater than the minimum spacing between said surfaces, and
   a plurality of protuberances circumferentially spaced with respect to said axis to define the other of said torque transmitting surfaces,
   whereby upon rotation of said one member said fibers engage said protuberances to transmit torque between said members through resistance of said fibers to bending.

9. A torque transmitting device as recited in claim 8 including means for adjusting said spacing between said facing planar surfaces to permit adjustment of the torque that may be transmitted between said members.

10. A torque transmitting device as recited in claim 8 wherein said protuberances define a generally uniform pattern torque transmitting surface.

11. A torque transmitting device as recited in claim 10 wherein said protuberances are defined by a regular woven mesh secured to a generally solid planar support surface.

12. A torque transmitting device as recited in claim 11 including means for adjusting said spacing between said facing planar surfaces to permit adjustment of the torque that may be transmitted between said members.

13. A torque transmitting device as recited in claim 12 wherein said means for adjusting said spacing includes resilient means for urging said members together to urge the free ends of said fibers through said mesh into contact with said solid support surface.

14. A torque transmitting device as recited in claim 8 wherein said members are disk-shaped and coaxial.

15. A torque transmitting device as recited in claim 8 wherein said other member is supported against rotation to form a constant limiting torque rotational brake.

16. A torque transmitting device as recited in claim 8 wherein said other member is independently supported coaxially with said first member for rotation about the common axis to form a constant limiting torque slip clutch.

17. A torque transmitting device comprising:
a pair of coaxially supported interfitting cylinders having curved, spaced, generally parallel, normally opposed torque transmitting surfaces, at least one of said members being supported for rotation about the common axis,
a plurality of short, elastic normally straight fibers secured to one of said torque transmitting surfaces and extending generally perpendicularly therefrom generally equal distances greater than the minimum spacing between said torque transmitting surfaces, and
a plurality of protuberances circumferentially spaced with respect to said common axis of said members to define the other of said torque transmitting surfaces,
whereby upon relative rotation of said members said fibers engage said protuberances to transmit torque between said members through the resistance of said fibers to bending.

18. A torque transmitting device as recited in claim 17 including means for effecting relative axial movement of said members to permit relative offsetting of said torque transmitting surfaces to adjust the extent of engagement of said fibers with said protuberances and the torque that may be transmitted between said members.

19. A torque transmitting device as recited in claim 17 wherein said protuberances define a generally uniform pattern torque transmitting surface.

20. A torque transmitting device as recited in claim 19 wherein said protuberances are defined by a regular woven mesh secured to a generally solid support surface.

21. A torque transmitting device as recited in claim 20 including means for effecting relative axial movement of said members to permit relative offsetting of said torque transmitting surfaces to adjust the extent of engagement of said fibers with said protuberances and the torque that may be transmitted between said members.

22. A torque transmitting device as recited in claim 17 wherein said other member is supported against rotation to form a constant limiting torque rotational brake.

23. A torque transmitting device as recited in claim 17 wherein said other member is independently supported for rotation about said common axis to form a constant limiting torque slip clutch.

* * * * *